United States Patent
Mathew et al.

(10) Patent No.: US 10,878,339 B2
(45) Date of Patent: Dec. 29, 2020

(54) LEVERAGING MACHINE LEARNING TO PREDICT USER GENERATED CONTENT

(71) Applicant: Google Inc., Mountain View, CA (US)

(72) Inventors: Arun Mathew, New York, NY (US); Kaleigh Smith, Brooklyn, NY (US); Per Anderson, New York, NY (US); Ian Langmore, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 885 days.

(21) Appl. No.: 15/417,459

(22) Filed: Jan. 27, 2017

(65) Prior Publication Data

US 2018/0218282 A1  Aug. 2, 2018

(51) Int. Cl.
  *G06N 20/00* (2019.01)
  *G06N 5/04* (2006.01)
  *G06N 3/04* (2006.01)

(52) U.S. Cl.
  CPC ............ *G06N 20/00* (2019.01); *G06N 3/04* (2013.01); *G06N 5/04* (2013.01)

(58) Field of Classification Search
  CPC ............ G06N 20/00; G06N 3/04; G06N 5/04
  See application file for complete search history.

(56) References Cited

U.S. PATENT DOCUMENTS

| | | | |
|---|---|---|---|
| 7,966,282 B2 | 6/2011 | Pinckney et al. | |
| 9,037,464 B1 * | 5/2015 | Mikolov | G06F 17/2785 704/255 |
| 9,450,771 B2 | 9/2016 | Browning et al. | |
| 2008/0040301 A1 | 2/2008 | Sadagopan et al. | |
| 2009/0125397 A1 | 5/2009 | Gomaa et al. | |
| 2009/0204478 A1 | 8/2009 | Kaib et al. | |
| 2010/0094849 A1 | 4/2010 | Rose et al. | |
| 2010/0138370 A1 | 6/2010 | Wu et al. | |
| 2013/0204664 A1 | 8/2013 | Romagnolo et al. | |
| 2016/0217701 A1 * | 7/2016 | Brown | G09B 7/00 |
| 2016/0220165 A1 * | 8/2016 | Taherkhani | A61B 5/4011 |
| 2017/0103469 A1 * | 4/2017 | Jiao | G16H 50/30 |

* cited by examiner

*Primary Examiner* — Austin Hicks
(74) *Attorney, Agent, or Firm* — Dority & Manning, PA

(57) ABSTRACT

Systems and methods of leveraging machine learning to predict user generated content are provided. For instance, first entity data associated with an entity can be received. The first entity data can include user specified data associated with an attribute of the entity. The first entity data can be input into a machine-learned content prediction model. Inferred entity data can be received as output of the machine-learned content prediction model. The inferred entity data can include inferred data descriptive of the attribute of the entity.

20 Claims, 3 Drawing Sheets

LEVERAGING MACHINE LEARNING TO PREDICT USER GENERATED CONTENT

FIELD

The present disclosure relates generally to leveraging machine learning to predict user generated content

BACKGROUND

User generated content can be used obtain information about various entities. Such user generated content can be obtained, for instance, by engaging a plurality of users in a contribution experience. For instance, such contribution experience can include a question and answer system wherein questions and/or other prompts relating to various entities are provided to the users, and the users are instructed to provide responses to the questions and/or prompts. The user responses can be used to make inferences associated with attributes of the various entities. Such contribution experiences may require a significant number of user responses before an accurate inference can be made regarding an entity. For instance, a large number of users may be required to indicate that a particular entity possesses an attribute so that an accurate inference regarding the possession of the attribute by the entity can be made.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of predicting user generated content. The method includes receiving, by one or more computing devices, first entity data associated with an entity. The first entity data includes user specified data associated with an attribute of the entity. The method further includes inputting, by the one or more computing devices, the first entity data into a machine-learned content prediction model. The method further includes receiving as output of the machine-learned content prediction model, by the one or more computing devices, inferred entity data comprising inferred data descriptive of the attribute of the entity.

Other example aspects of the present disclosure are directed to systems, apparatus, tangible, non-transitory computer-readable media, user interfaces, memory devices, and electronic devices for leveraging machine learning to predict user generated content.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
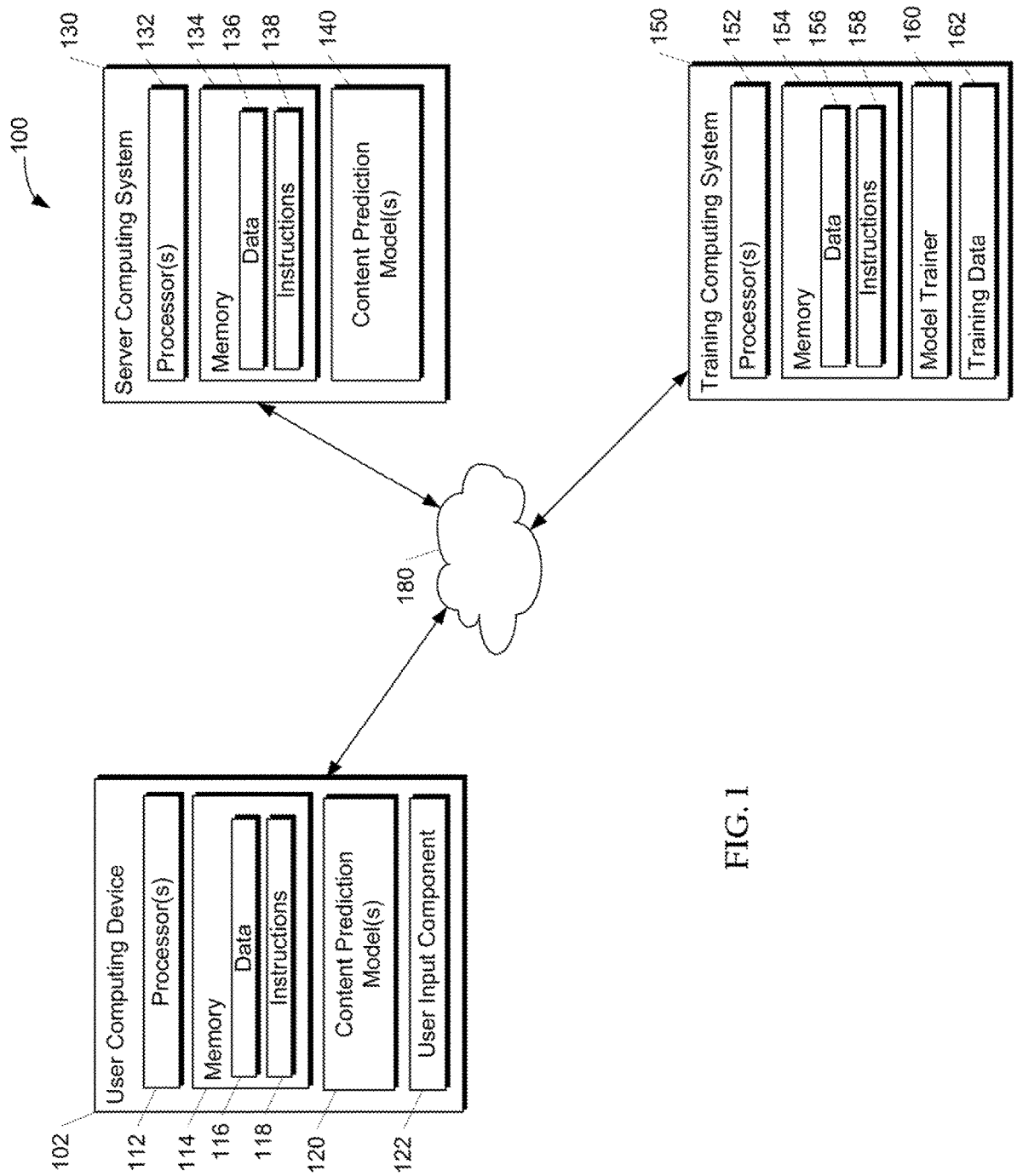
FIG. 1 depicts an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to leveraging machine learning to infer user generated content descriptive of one or more entities. Such inferred content can be used to determine various attributes of the one or more entities. For instance, user specified entity data associated with an attribute of an entity can be received. The entity data can include user responses to an information collection task provided to one or more users. The information collection task, for instance, can prompt users to respond to one or more questions associated with the entity. The entity data can be provided as input to a machine-learned content prediction model. In some implementations, the machine-learned content prediction model can include a logistic regression. The machine-learned content prediction model can provide as output inferred entity data associated the attribute of the entity. The inferred entity data can include information associated with predicted or estimated results of the information collection task.

More particularly, the information collection task can be associated with a question and answer system or other contribution experience used to collect information associated with an entity. The information collection task can be any suitable task provided to one or more users that prompts the users to provide a response associated with an attribute of an entity. The entity can be any suitable entity, such as a business, restaurant, movie, song, book, video, product, or any other suitable entity for which descriptive information can be obtained. The information collection task can be associated with a survey, questionnaire, etc. associated with the entity. In particular, the information collection task can be a question provided to the users associated with the attribute of the entity. In some implementations, the questions can be a "Boolean question" having possible answers of "true" or "false" (or "unsure"). For instance, an information task can include a provision of a question asking whether a particular restaurant provides a romantic atmosphere, or whether the restaurant provides an accommodating atmosphere for large groups. In this manner, a user can provide a true response to indicate that the entity possesses the attribute or a false response to indicate that the entity does not possess the attribute. The user specified entity data can include data indicative of the user response(s) to the provided information collection tasks.

As indicated, such user specified entity data can be provided as input to the machine-learned content prediction model. In particular, the user specified entity data can be provided to the logistic regression of the content prediction model. In some implementations, the logistic regression can further receive global entity data as input. The global entity data can include any suitable structured or unstructured data associated with the entity, one or more additional entities, a geographic area (e.g. city, county, area code, country, etc.) in which the entity is located, and/or other suitable data. For instance, the global data can include data indicative of user responses to various other information collection tasks associated with the entity and/or the additional entities, various attributes of the entity and/or the additional entities, keywords associated with the entity and/or the additional entities, etc. In some implementations, the global entity data can be associated with a profile of the entities that describes various aspects of the entities. The global entity data can be obtained from various suitable databases, such as databases associated with a geographic information system. In some implementations, the global entity data can be obtained from suitable websites.

The logistic regression can be configured to provide as output a predicted or estimated "best guess" response rate. The "best guess" response rate can be a prediction of user responses to the information collection task as the number of user responses approaches infinity. For instance, the response rate can be a "true rate" specifying a predicted ratio of "true" responses to the total amount of responses to the information collection task as the number of responses approaches infinity. The response rate can be determined based at least in part on the entity data and/or the global entity data. For instance, correlations can be identified within the global entity data. Such correlations can indicate a likelihood of an attribute of an entity based at least in part on various signals within the global entity data. For instance, it can be determined that entities that are categorized as a microbrewery (as specified by the global entity data) generally receive high "true" response rates to an information collection task asking whether the entity provides a good atmosphere for groups. A logistic regression associated with an information collection task asking whether a subject microbrewery is good for groups can consider such correlation when determining a predicted response rate for the information collection task. In this manner, the response rate can be determined based at least in part on attributes of the subject entity that are shared with or similar to attributes of various other entities.

The machine-learned content prediction model can further include a beta-binomial model coupled to the logistic regression. In such implementations, the output of the logistic regression (e.g. the predicted response rate) can be provided as input to the beta-binomial model. In some implementations, the user specified entity data can further be provided to the beta-binomial model as input. The beta-binomial model can be configured to output inferred entity data associated with the entity and the information collection task. In particular, the beta-binomial model can be configured to determine a confidence score associated with the predicted response rate. In some implementations, the beta-binomial model can be configured to determine inferential statements based at least in part on the response rate and/or confidence score. For instance, the beta-binomial model can be configured to output an inferential statement indicating a percentage of likelihood that the "true" response rate to the Boolean question of the information collection task will be greater than some threshold. Similarly, the beta-binomial model can output an inferential statement indicating that a percentage of likelihood that the "true" response rate to the Boolean question of the information collection task will be less than some threshold. In some implementations, the beta-binomial model can be configured to generate a probability density function specifying the probabilities of various response rates associated with the information collection task.

The output of the beta-binomial model can be used to determine the attribute associated with the information collection task. For instance, the inferred entity data can be used to determine whether the entity possesses the attribute associated with the information collection task. As an example, an information collection task asking whether the entity provides a good atmosphere for groups can be answered positively or negatively based at least in part on the inferred entity data output by the beta-binomial model. In this manner, the attribute can be determined based on whether the inferred entity data meets some suitable criteria. For instance, the criteria can be associated with the inferential statement output by the beta-binomial model. In such instances, the criteria can be associated with some threshold percentage of the likelihood that the "true" response rate is greater than (or equal to) the threshold. When such likelihood is greater than the threshold percentage, the information collection task can be answered positively and the attribute associated with the information task can be assigned to or otherwise associated with the entity. In continuing the above example, if the likelihood that a suitable number of users will indicate that the entity provides a good atmosphere for groups is greater than the threshold percentage, the entity can be labeled as having a good group atmosphere. Similarly, if the likelihood that a suitable number of users will indicate that the entity does not provide a good atmosphere for groups is greater than the threshold percentage, it can be inferred that the entity does not have a good atmosphere for groups. In some implementations, if it cannot be determined whether entity provides a good atmosphere for groups, the entity will not be labeled as having a good group atmosphere.

In some implementations, a utility of the information collection task can be determined based at least in part on the inferred entity data provided as output by the beta-binomial model. More particularly, the utility can be determined based at least in part on the confidence score associated with the response rate. The utility can indicate an estimated adjustment in the likelihood that the response rate will be greater than (or less than) the threshold (e.g. associated with the inferential statement) upon receiving an additional response to the information collection task. In some implementations, the utility score can indicate an estimated increase in the likelihood that the response rate will be greater than the threshold upon receiving an additional "true" response to the information collection task.

As indicated, the information collection task can be associated with a question and answer system wherein a plurality of information collection tasks are provided to a plurality of users to "crowd source" information collection associated with a plurality of entities. In this manner, example aspects of the present disclosure can be applied to a plurality of information collection tasks within the question and answer system. In such implementations, the utilities determined for the information collection tasks can be used to prioritize and/or rank the information collection tasks. The information collection tasks can be provided to subsequent users in accordance with the prioritization. For instance, an information collection task having a higher utility can be provided to a user prior to a provision of an information collection task having a lower utility. In this manner, information collection tasks for which a subsequent additional response will have a greater effect on the ability to determine an attribute for an entity can be prioritized in the provision of the information collection tasks.

With reference now to the figures, example aspects of the present disclosure will be discussed in greater detail. For instance, FIG. 1 depicts an example system 100 for predicting user generated content according to example aspects of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can store or include one or more content prediction models 140. For example, the content prediction models 140 can be or can otherwise include various machine-learned models such as logistic regressions, beta-binomial models, neural networks (e.g., deep neural networks) or other multi-layer non-linear models. Neural networks can include recurrent neural networks (e.g., long short-term memory recurrent neural networks), feed-forward neural networks, or other forms of neural networks. Example content prediction models 140 are discussed with reference to FIG. 2.

More particularly, the content prediction model(s) 120 can be used in predicting or inferring user generated content associated with one or more information collection tasks. An information collection task can be associated with a question and answer system that provides questions or other submissions associated with an entity to users and prompts the users to respond based on the characteristics of the entity. For instance, the question and answer system can be a survey, questionnaire, etc. provided to the users to obtain crowd sourced information relating to the entity. As indicated, the entity can be any suitable entity, such as a geographic location, point of interest, business, restaurant, landmark, song, movie, video, book, product, or any other suitable entity for which information can be obtained via the question and answer system.

In this manner, the server computing system 130 can provide data indicative of an information collection task to a plurality of user computing devices 102. Although only one user computing device 102 is depicted in FIG. 1, it will be appreciated that the server computing system 130 can provide information collection tasks to any suitable number of user computing devices 102 via the network 180. Users of the user computing device 102 can interact with the respective user computing devices 102 to respond to the information collection task, and one or more user computing devices 102 can provide data indicative of the received response(s) to the server computing system 130. In this manner, the user computing device 102 can include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone suitable for voice recognition, a traditional keyboard, mouse or other means by which a user can enter a communication.

The server computing system 130 can provide the data indicative of the response(s) (e.g. entity data) as input to the content prediction model(s) 140. The server computing system can further provide global entity data associated with the entity and/or one or more additional entities as input to the content prediction model(s) 140. The content prediction model(s) 140 can be configured to determine a predicted response rate for the information collection task based at least in part on the data indicative of the response and the global entity data. The predicted response rate can specify an estimated rate of "true" responses to the information collection task and/or an estimated rate of "false" responses to the information collection task. The content prediction model(s) 140 can further be configured to determine a probability density function associated with the information collection task based at least in part on the predicted response rate and/or the received responses to the information collection task. The probability density function can quantify various probabilities of the response rate (e.g. true rate) to the information collection task taking on different values. In this manner, the probability density function can provide a relative likelihood of occurrence for any given response rate in the sample space. The server computing system 130 can be configured to confirm or reject the attribute sought by the information collection task based at least in part on the probability density function. For instance, if the probability density function specifies a high confidence that the true response rate will be higher than a threshold, the attribute can be confirmed. If the probability density function specifies a high confidence that the true response rate will be below the threshold, the attribute can be rejected. In some implementations, the attribute can be assigned as unknown if the server computing system 130 is unable to determine a response rate with a high enough confidence that the true response rate will be greater than or less than the threshold.

Additionally or alternatively, one or more content prediction models 120 can be included in or otherwise stored and implemented by the user computing device 102 that communicates with the server computing system according to a client-server relationship. In some implementations, the one or more content prediction models 120 can be received from the server computing system 130 over network 180, stored in the user computing device memory 114, and used or otherwise implemented by the one or more processors 112. In some implementations, the user computing device 102 can implement multiple parallel instances of a single content prediction model 120.

In some implementations, the content prediction models 140 can be implemented by the server computing system 130 as a portion of a web service (e.g., geographic information system, user generated content service, etc.). Thus, one or more models 120 can be stored and implemented at the user computing device 102 and/or one or more models 140 can be stored and implemented at the server computing system 130.

As described above, the server computing system 130 can store or otherwise includes one or more machine-learned content prediction models 140. For example, the content prediction model(s) 140 can be or can otherwise include various machine-learned models such as neural networks (e.g., deep recurrent neural networks) or other multi-layer non-linear models. Example content prediction models 140 are discussed with reference to FIG. 2.

The server computing system 130 can train the content prediction models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a content prediction model 140 based on a set of training data 142. The training data 142 can include, for example, data indicative of a plurality of user responses to an information collection task. In some implementations, the training data can include a first subset of the plurality of user responses. More particularly, the first subset of user responses can be input to the content prediction model(s) 140. The output of the content prediction model(s) 140 can be evaluated against a second subset of the plurality of user responses. For instance, the estimated response rate determined by the content prediction model(s) 140 can be evaluated against the response rate of the second subset of the plurality of user responses. The content prediction model(s) 140 can be trained based at least in part on such evaluation. In some implementations, the first and second subsets can be determined based at least in part on a chronological order in which the user responses were received. For instance, the first subset can include one or more user responses received during a first time period, and the second subset can include one or more user responses received during a second time period that is subsequent to the first time period.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the content prediction models 120 can be both trained and used locally at the user computing device 102.

Figure 2:
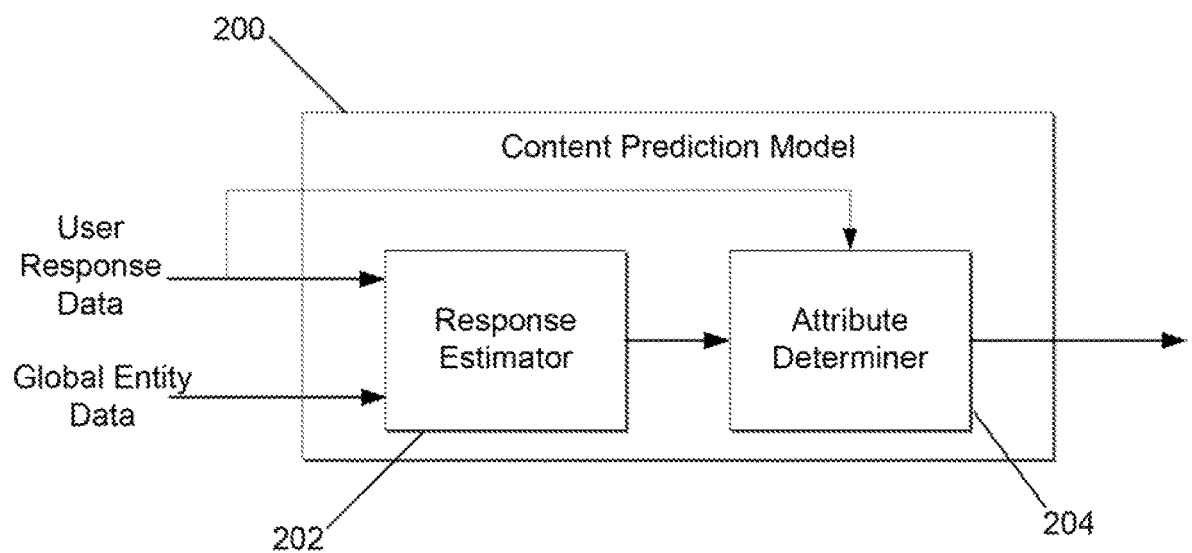
FIG. 2 depicts an example machine-learned content prediction model according to example embodiments of the present disclosure.

FIG. 2 depicts a block diagram of an example content prediction model 200 according to example embodiments of the present disclosure. The content prediction model 200 can be trained to inferred user generated content associated with an entity. The content prediction model 200 can include a response estimator 202 and an attribute determiner 204. In some implementations the content prediction model can include a different response estimator for each information collection task for which an attribute determination is to be made.

The content prediction model 200 can be configured to output an attribute determination associated with the entity and an information collection task. More particularly, the content prediction model can be configured to output the attribute determination based at least in part on user response data and a set of global entity data. In this manner, the response estimator 202 can be configured to receive as input a set of user response data specifying of one or more user responses to an information collection task associated with an entity. The response estimator 202 can further be configured to receive as input the global entity data. The global entity data can include data associated with entity and/or information associated with one or more additional entities. The global entity data can include any suitable structured or unstructured data associated with the entity, one or more additional entities, a geographic area (e.g. city, county, area code, country, etc.) in which the entity is located, and/or other suitable data. For instance, the global data can include data indicative of user responses to various other information collection tasks associated with the entity and/or the additional entities, various attributes of the entity and/or the additional entities, keywords associated with the entity and/or the additional entities, etc.

The response estimator 202 can include one or more logistic regressions. Additionally or alternatively, the response estimator 202 can include one or more neural networks, support vector machines, hidden Markov models, and other machine-learned models. In addition, in some implementations, the response estimator 202 can include or implement additional alternative approaches such as rule-based systems (e.g., as machine-learned from data or manually created).

The one or more logistic regressions or other machine-learned models of the response estimator 202 can be trained on a training dataset that includes, for example, user response data and/or global entity data. The training dataset can include any suitable structured or unstructured data. In this manner, the response estimator 202 can be trained to recognize and/or interpret information included within the global entity data. In particular, the response estimator 202 can be trained to identify various suitable correlations between entity attributes and information collection task responses. For instance, the response estimator 202 can be configured to identify that entities having one or more particular attributes or features generally receive high true response rates to an information collection task associated with a particular subject attribute. In this manner, such correlations can be determined based at least in part on user responses to information collection tasks received for such entities and/or various suitable attributes, features, or characteristics known about the entities. As a particular example, the response estimator 202 can be trained to identify that entities categorized as Italian restaurants generally receive high true response rates to information collection tasks asking if such restaurants serve wine.

Such correlations can be identified, for instance, by the logistic regression of the response estimator 202. Such correlations can further be used, along with the user response data, to estimate the response rate for the information collection task by the logistic regression. In this manner, data indicative of the estimated response rate can be provided as output of the response estimator 202. Such data indicative of the estimated response rate can then be provided as input to the attribute determiner 204. The user response data can further be provided as input to the attribute determiner 204.

The attribute determiner 204 can include one or more beta-binomial models, neural networks (e.g. deep neural networks), recurrent neural networks (e.g. LSTM recurrent neural networks, gated recurrent unit networks), support vector machines, hidden Markov models, or other suitable networks. In addition, in some implementations, the response estimator 204 can include or implement additional alternative approaches such as rule-based systems (e.g., as machine-learned from data or manually created).

The one or more beta-binomial models or other machine-learned models of the attribute determiner 204 can be trained on a suitable training data set according to example aspects of the present disclosure. For instance, the training data set can be the same data set or a similar data set as the data set used to train the response estimator 202. In this manner, the training data set can include data indicative of one or more user responses to one or more information collection tasks and/or global entity data associated with one or more entities.

The attribute determiner 204 can be trained to determine a confidence score for the estimated response rate provided by the response estimator 202. In some implementations, the attribute determiner 204 can be configured to determine a probability density function specifying the likelihoods of various response rates. The confidence score and/or the probability density function can be determined based at least in part on the user response data and/or the estimated response rate. In some implementations, the confidence score and/or the probability density function can be determined based at least in part on the global entity data.

The content prediction model 200 can be configured to confirm or reject the attribute associated with the information collection task based at least in part on the confidence score and/or the probability density function. In some implementations, the confirmation or rejection can be determined based on a set of predetermined criteria for confirming or rejecting the attribute. Such criteria can specify a threshold probability that the response rate is greater than a response rate threshold. For instance, the criteria for confirming the attribute can require a 90% probability that the true response rate to the information collection task is greater than or equal to ⅔. In this manner, if the criteria for confirming the attribute is met or exceeded, the attribute can be confirmed, and the attribute can be assigned to the entity. Similarly, the criteria for rejecting the attribute can require a 90% probability that the true response rate will be less than ⅔. In this manner, if the criteria for rejecting the attribute is met or exceeded, the attribute can be rejected, and the attribute will not be assigned to the entity. If neither the criteria for confirming nor the criteria for rejecting the attribute is met, the attribute can be assigned as unknown for the entity.

The machine-learned content prediction model 200 depicted in FIG. 2 is described for illustrative purposes. It will be appreciated that various other suitable machine-learned content prediction models can be used without deviating from the scope of the present disclosure. For instance, in some implementations, the content prediction model 200 can include one or more neural networks (e.g. deep neural networks). In such implementations, the response estimator 202 and/or the attribute determiner 204 can include such neural networks. For instance, the response estimator 202 and the attribute determiner 204 can be implemented using a single neural network. Such neural network(s) can integrate a beta-binomial loss function. In this regard, the neural network(s) can be configured to determine one or more estimated response rates and/or confidence scores associated with the estimated response rates. Such estimated response rates and/or confidence scores can be used to confirm or reject an attribute of an entity according to example aspects of the present disclosure.

Figure 3:
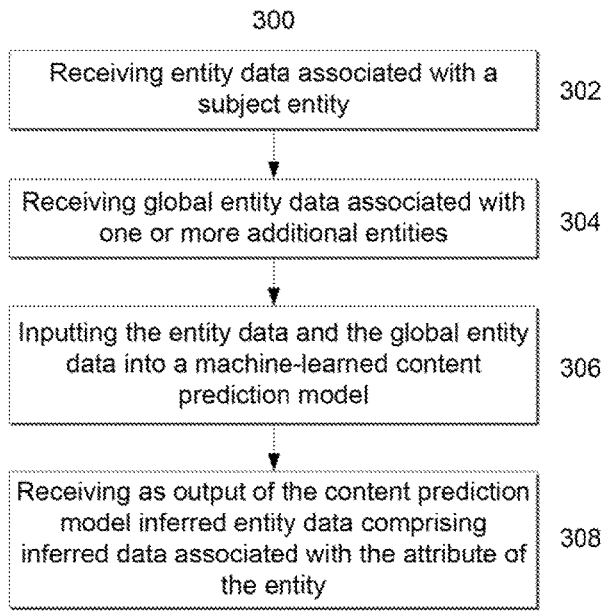
FIG. 3 depicts a flow diagram of an example method of predicting user generated content according to example embodiments of the present disclosure.

FIG. 3 depicts a flow diagram of an example method (300) of predicting user generated content according to example embodiments of the present disclosure. The method (300) can be implemented by one or more computing devices, such as one or more of the computing devices depicted in FIG. 1. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), the method (300) can include receiving entity data associated with a subject entity. The entity can be any suitable entity, such as a restaurant, business, song, movie, book, product, etc. The entity data can include user response data associated with an information collection task provided to one or more users. The information collection task can be provided to the users with the object of obtaining information about an entity. More particularly, the information collection task can be associated with a particular attribute, and the information collection task can be provided to the users with the object of determining whether the entity possesses the attribute. For instance, the information collection task can be associated with a question and answer system, such as a survey or questionnaire in which users are asked to provide information associated with one or more entities. In this manner, the information collection task can be a particular question or prompt provided to the user. In some implementations, the information collection task can provide a Boolean question to the user, such that the user can respond with either a true response if the user believes that the entity possesses the particular attribute or a false response if the user does not believe that the entity possesses the particular attribute. As an example, the information collection task can be associated with an attribute of the sale of wine, and the information collection task can be provided to a user to determine whether a particular restaurant possesses the attribute of the sale of wine. The user can provide a true response to indicate that the restaurant sells wine, or the user can provide a false response to indicate that the restaurant does not sell wine.

At (304), the method (300) can include receiving global entity data associated with the subject entity and/or one or more additional entities. The global entity data can specify one or more suitable features, characteristics, or attributes of the subject entity and/or the one or more additional entities. The global entity data can be obtained from various suitable sources, such as various suitable databases, websites, etc. In this manner, the global entity data can include any suitable structured or unstructured data.

At (306), the method (300) can include inputting the entity data and the global entity data into a machine-learned content prediction model. The machine-learned content prediction model can be any suitable model. For instance, the content prediction model can include one or more logistic regressions, beta-binomial models, neural networks, support vector machines, hidden Markov models, and/or other suitable networks. In some implementations, the content prediction model can be the content prediction model 200 depicted in FIG. 2.

At (308), the method (300) can include receiving as output of the content prediction model inferred entity data associated with the subject entity. The inferred entity data can be determined based at least in part on the entity data and/or the global entity data. The inferred entity data can include a "best guess" response rate to the information collection task specifying an estimated response rate to the information collection task as the number of user responses approaches infinity. The inferred entity data can further include a confidence score associated with the "best guess" response rate specifying an amount of confidence that the "best guess" response rate will be correct. The inferred entity data can further include a probability density function specifying the likelihood of the occurrence of various suitable response rates. The inferred entity data can further include one or more inferential statements associated with the predicted or estimated response rate. For instance, such inferential statements can specify a probability that the response rate will be greater than or less than a threshold. Such inferential statements can be determined in accordance with the threshold to confirm or reject the attribute of the entity. For instance, the threshold can be a predetermined threshold that must be met to confirm or reject the attribute. For instance, the attribute may be confirmed if it can be determined with a high enough likelihood that the true response rate to the information collection task will be greater than or equal to the threshold. Similarly, the attribute may be rejected if it can be determined with a high enough likelihood that the true response rate to the information collection task will not be greater than or equal to the threshold. In some implementations, a probability density function associated with an estimated false response rate can be determined, and the attribute can be confirmed or rejected based at least in part on the likelihood of occurrence of the estimated false response rates.

In this manner, the inferred entity data can further include a confirmation or rejection of the attribute for the entity. A profile or other collection of information associated with the entity can then be updated to reflect the confirmation or rejection of the entity. For instance, if the attribute has been confirmed, the attribute can be assigned to the entity within the entity profile. Similarly, if the attribute is rejected, the attribute will not be assigned to the entity. In some implementations, if the attribute is rejected, the entity profile can be updated to indicate that the entity does not possess the attribute.

Figure 4:
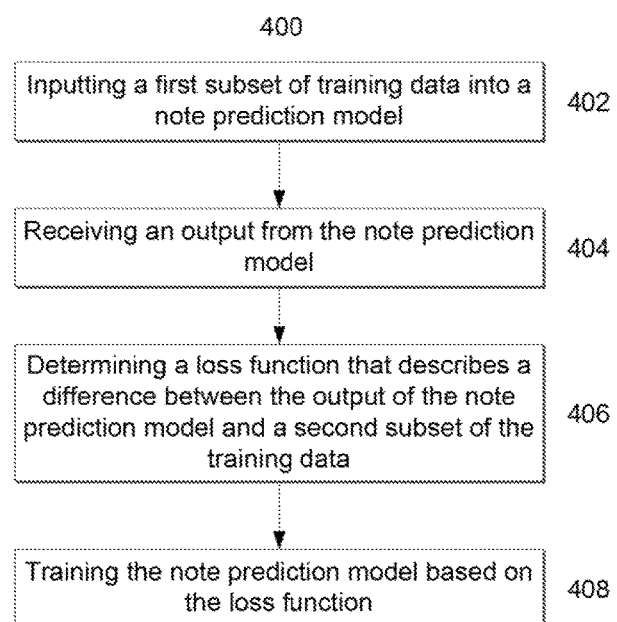
FIG. 4 depicts a flow diagram of an example method of training a content prediction model according to example embodiments of the present disclosure.

FIG. 4 depicts a flow diagram of an example method (400) of training a content prediction model according to example aspects of the present disclosure. Method (400) can be implemented by one or more computing devices, such as one or more of the computing devices depicted in FIG. 1. In addition, FIG. 4 depicts steps performed in a particular order for purposes of illustration and discussion.

At (402), the method (400) can include inputting a first subset of a set of training data into a content prediction model according to example aspects of the present disclosure. The training data can include data indicative of user responses to an information collection task provided to a plurality of users. In some implementations, the training data can further include data specifying one or more features, characteristics, or attributes of a plurality of entities.

In this manner, the first subset of training data can include data indicative of one or more one or more user responses to the information collection task and/or global entity data. As indicated, the first subset of training data can be selected based on an order in which the user responses were received. For instance, the first subset of training data can include one or more user responses received during a first time period.

At (404), the method (400) can include receiving an output from the content prediction model. In some implementations, the output can include an estimated response rate to the information collection task. In some implementations, the output can include a probability density function specifying a likelihood of occurrence of various response rates. Such output of the content prediction model can be determined according to example aspects of the present disclosure.

In some implementations, the content prediction model can include various suitable portions (e.g. response estimator 202, attribute determiner 204, etc.). In such implementations, the portions of content prediction model can be trained independently in portion-specific training sessions.

For instance, the response estimator can be trained independently of a training of the attribute determiner. In such implementations, the received output from the content prediction model can be an intermediate output generated by the particular portion associated with the training session. For instance, the received output can be an output of the response estimator (e.g. a "best guess" response rate), an output of the attribute determiner (e.g. probability density function), etc.

At (406), the method (400) can include determining a loss function that describes a difference between the output of the content prediction model and a second subset of the training data. For instance, the second subset of training data can include one or more subsequently received user responses to the information collection task relative to the user response data included within the first subset of training data. In this manner, the loss function can describe a difference between an estimated response rate generated by the content prediction model and a response rate associated with user responses when taking into account the subsequently received user responses.

At (408), the method (400) can include training the content prediction model based at least in part on the loss function. For instance, training the content prediction model can include performing truncated backwards propagation through time to backpropagate the loss function through the content prediction model. A number of generalization techniques (e.g., weight decays, dropouts, etc.) can optionally be performed at 408 to improve the generalization capability of the models being trained. After the model has been trained at 408, it can be provided to and stored at a computing device for use in predicting user generated content. More particularly, the training procedure described in 402-408 can be repeated several times (e.g., until an objective loss function no longer improves) to train the model.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of predicting user generated content, the method comprising:
    receiving, by one or more computing devices, first entity data and global entity data, wherein the first entity data comprises one or more responses to an information collection task associated with whether or not an entity possesses a particular attribute, and wherein the global entity data is associated with user responses to other information collection tasks associated with the entity;
    inputting, by the one or more computing devices, the first entity data and the global entity data into a machine-learned content prediction model;
    receiving as output of the machine-learned content prediction model, by the one or more computing devices, inferred entity data comprising a confidence score based on an estimated response rate-associated with a predicted ratio of the one or more responses to the information collection task that are true, wherein whether or not the entity possesses the particular attribute is based at least in part on whether or not the estimated response rate exceeds a response rate threshold; and
    determining, by the one or more computing devices, a utility score based at least in part on the inferred entity data, wherein the utility score indicates an estimated increase in a likelihood that the estimated response rate will exceed the response rate threshold upon receiving an additional response to the information collection task.

2. The computer-implemented method of claim 1, wherein the information collection task comprises a question associated with the particular attribute of the entity, and wherein the first entity data comprises one or more answers to the question provided by the one or more users.

3. The computer-implemented method of claim 2, wherein the machine-learned content prediction model further comprises a logistic regression and a beta-binomial model coupled to the logistic regression.

4. The computer-implemented method of claim 3, further comprising:
    receiving, by the one or more computing devices, the estimated response rate to the information collection task as output of the logistic regression; and
    inputting, by the one or more computing devices, the estimated response rate to the beta-binomial model of the machine-learned content prediction model.

5. The computer-implemented method of claim 4, wherein receiving as output of the machine-learned content prediction model, by the one or more computing devices, inferred entity data comprises receiving the inferred entity data as output of the beta-binomial model.

6. The computer-implemented method of claim 1, wherein the inferred entity data comprises an estimated collective result of the information collection task, the estimated collective result determined based at least in part on the estimated response rate and the confidence score.

7. The computer-implemented method of claim 1, further comprising determining, by the one or more computing devices, a prioritization of a plurality of information collection tasks based at least in part on the utility score.

8. The computer-implemented method of claim 7, further comprising providing, by the one or more computing devices, one or more additional information collection tasks to one or more users based at least in part on the prioritization.

9. The computer-implemented method of claim 1, further comprising training, by the one or more computing devices; the content prediction model based on a set of training data;
    wherein training the content prediction model comprises backpropagating, by the one or more computing devices, a loss function through the content prediction model.

10. The computer-implemented method of claim 1, wherein the machine-learned content prediction model comprises a neural network that integrates a beta-binomial loss function.

11. A computing system, comprising:
one or more processors; and
one or more memory devices, the one or more memory devices storing computer-readable instructions that when executed by the one or more processors cause the one or more processors to perform operations, the operations comprising:
receiving first entity data and global entity data, wherein the first entity data comprises one or more responses to an information collection task associated with whether or not an entity possesses a particular attribute, and wherein the global entity data is associated with user responses to other information collection tasks associated with the entity;
inputting the first entity data and the global entity data into a machine-learned content prediction model;
receiving as output of the machine-learned content prediction model, inferred entity data comprising a confidence score based on an estimated response rate associated with a predicted ratio of the one or more responses to the information collection task that are true, wherein whether or not the entity possesses the particular attribute is based at least in part on whether or not the estimated response rate exceeds a response rate threshold; and
determining a utility score based at least in part on the inferred entity data, wherein the utility score indicates an estimated increase in a likelihood that the estimated response rate will exceed the response rate threshold upon receiving an additional response to the information collection task.

12. The computing system of claim 11, wherein the information collection task comprises a question associated with the particular attribute of the entity, and wherein the first entity data comprises one or more answers to the question provided by the one or more users.

13. The computing system of claim 11, wherein the machine-learned content prediction model further comprises a logistic regression and a beta-binomial model coupled to the logistic regression.

14. One or more tangible, non-transitory computer-readable media storing computer-readable instructions that when executed by one or more processors cause the one or more processors to perform operations, the operations comprising:
receiving first entity data and global entity data, wherein the first entity data comprises one or more responses to an information collection task associated with whether or not an entity possesses a particular attribute, and wherein the global entity data is associated with user responses to other information collection tasks associated with the entity;
inputting the first entity data and the global entity data into a machine-learned content prediction model;
receiving as output of the machine-learned content prediction model, inferred entity data comprising a confidence score based on an estimated response rate associated with a predicted ratio of the one or more responses to the information collection task that are true, wherein whether or not the entity possesses the particular attribute is based at least in part on whether or not the estimated response rate exceeds a response rate threshold; and
determining a utility score based at least in part on the inferred entity data, wherein the utility score indicates an estimated increase in a likelihood that the estimated response rate will exceed the response rate threshold upon receiving an additional response to the information collection task.

15. The one or more tangible, non-transitory computer-readable media of claim 14, wherein the machine-learned content prediction model further comprises a logistic regression and a beta-binomial model coupled to the logistic regression.

16. The one or more tangible, non-transitory computer-readable media of claim 14, wherein the machine-learned content prediction model comprises a neural network that integrates a beta-binomial loss function.

17. The one or more tangible, non-transitory computer-readable media of claim 14, wherein the machine-learned content prediction model is configured to generate a probability density function specifying probabilities associated with the information collection task.

18. The computer-implemented method of claim 1, wherein the machine-learned content prediction model is configured to generate a probability density function specifying probabilities associated with the information collection task.

19. The computing system of claim 11, wherein the machine-learned content prediction model is configured to generate a probability density function specifying probabilities associated with the information collection task.

20. The computing system of claim 11, further comprising:
determining a prioritization of a plurality of information collection tasks based at least in on the utility score.

* * * * *